United States Patent [19]

Fukuhara et al.

[11] 4,309,091
[45] Jan. 5, 1982

[54] EXPOSURE DISPLAY DEVICE IN A CAMERA

[75] Inventors: Toru Fukuhara, Isehara; Takashi Saegusa, Sagamihara, both of Japan

[73] Assignee: Nippon Kogaku K.K., Tokyo, Japan

[21] Appl. No.: 148,211

[22] Filed: May 9, 1980

[30] Foreign Application Priority Data

May 30, 1979 [JP] Japan ............................ 54/71765[U]

[51] Int. Cl.$^3$ .......................... G03B 7/28; G03B 17/20
[52] U.S. Cl. ........................................ 354/31; 354/53; 354/60 L; 354/72; 354/289; 356/222; 356/226; 356/227
[58] Field of Search ................. 354/289, 31, 53, 60 E, 354/60 L, 61, 72; 356/222, 226, 227

[56] References Cited

U.S. PATENT DOCUMENTS

4,176,955 12/1979 Yamada et al. ........................ 354/31
4,214,826 7/1980 Uchida et al. ........................ 356/222

Primary Examiner—L. T. Hix
Assistant Examiner—S. D. Schreyer
Attorney, Agent, or Firm—Fitzpatrick, Cella, Harper & Scinto

[57] ABSTRACT

An exposure display device for a camera including a metering device for effecting metering while dividing a phototaking picture plane into a plurality of areas and for emitting a plurality of photoelectric conversion signals corresponding to those areas and processing circuitry for operating and emitting a proper exposure signal from the output signals of the metering device comprises comparing circuitry for comparing the plurality of photoelectric conversion signals with the proper exposure signal and emitting the result of the comparison, and a display device for displaying the comparison results emitted by the comparing circuitry while causing the comparison result to correspond to the divided areas.

8 Claims, 15 Drawing Figures

EXPOSURE DISPLAY DEVICE IN A CAMERA

BACKGROUND OF THE INVENTION

1. Field of the Invention

This invention relates to an exposure display device in a camera having a metering device for measuring the brightness distribution of an object by means of a plurality of light-receiving elements and operationally processing the measured value and calculating a proper exposure value in accordance with the brightness distribution (such metering device will hereinafter be referred to as the multimetering device).

2. Description of the Prior Art

In a camera provided with a multimetering device using a plurality of light-receiving elements to effect metering while dividing the picture plane, a plurality of bits of brightness information are processed by a certain operation system and an operation result is displayed as a proper exposure value. Specifically, Japanese Laid-open Patent Application No. 12828/1977 and Japanese Laid-open Patent Application No. 52419/1978 disclose the following technique. The maximum value Pmax and the minimum value Pmin of a plurality responding to the brightness distribution of an object are detected, and the difference Pmax—Pmin therebetween, Pmax+Pmin)/2 are operated. The difference Pmax—Pmin is compared with a standard value S by a comparing circuit and when Pmax—Pmin≦S, the object is judged as one having a small brightness difference between various parts thereof, and when Pmax—Pmin>S, the object is judged as one having a great brightness difference between various parts thereof. When Pmax—Pmin≦S, the mean value Pmean of the plurality of metering outputs is emitted, and when Pmax—Pmin>S, discrimination is effected between a white back (for example, an object having a great deal of light background like a figure under counter-light) and a black back (for example, an object having a great deal of dark background like a figure under spot light illumination), and the maximum value Pmax or the minimum value Pmin is emitted.

The discrimination between a white back and a black back is effected by comparing the mean value with the medium value (Pmax+Pmean)/2. That is, when the median value is greater than the mean value, many objects are generally dark and are therefore judged as a black back, and in the converse case, many objects are judged as a white back. In the case of a black back ((Pmax+Pmin)/2≧Pmean), the maximum value Pmax is emitted, and in the case of a white back ((Pmax+Pmean)/2<Pmean), the minimum value Pmin is emitted. The mean value Pmean, the maximum value Pmax and the minimum value Pmin provide the final proper exposure value which determines the exposure of the entire picture plane.

Heretofore, however, with respect to the object at which part of the picture plane and thus determined exposure has been adjusted could not be known until photography was completed and the film was developed. Accordingly, except in the case of very common photography, the photograph obtained was sometimes different from the intention of the photographer. Taking an extreme case as an example, when the photographer photographs the scene of the evening sun setting at the mountain top, the exposure naturally differs depending on whether the photographer wants to photograph the mountain as the main subject with the sky being white and over-exposed or the photographer wants to photograph the evening sun and clouds as the main subject with the mountain as a silhouette. However, on the camera side, a judgment having the photographer's subjective intention added thereto has been impossible and there has been left nothing but choosing an exposure adjusted to one of the cases by a predetermined procedure.

SUMMARY OF THE INVENTION

We have conceived and contribute by the present invention means by which we are able to provide, in a camera provided with a multimetering device, a display device which enables the photographer to confirm, before shutter release, whether or not a proper exposure has been obtained with respect to a major object.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1A:
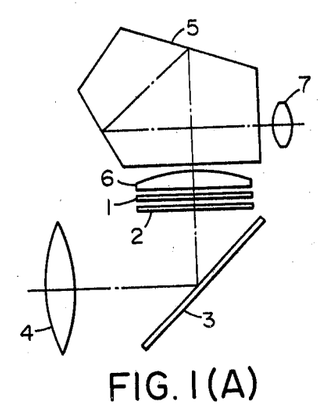
FIG. 1(A) shows an example in which an electrochromic element is used as the display element and which is incorporated in a single lens reflex camera.
Figure 1B:
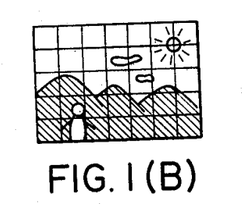
FIG. 1(B) illustrates the manner in which the object image in the viewfinder and the display element in the construction of FIG. 1(a) overlap each other.
Figure 2A:
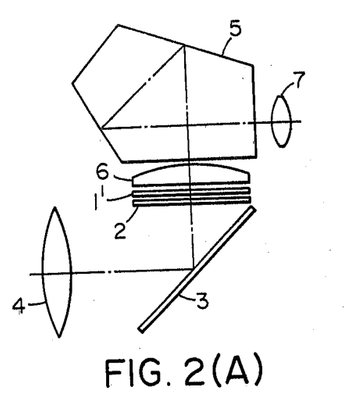
FIG. 2(A) shows an example in which liquid crystal is used as the display element and which is incorporated in a single lens reflex camera.
Figure 2B:
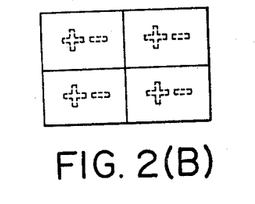
FIG. 2(B) illustrates an example of the display pattern.
Figure 3A:
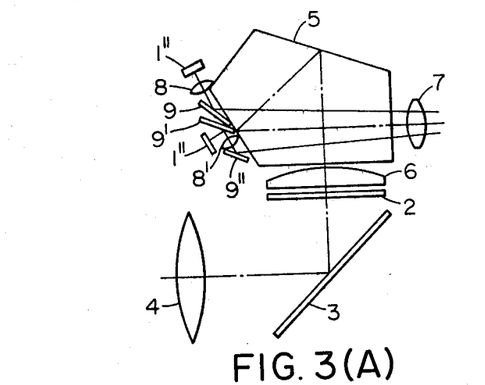
FIG. 3(A) shows an example in which a light-emitting diode is used as the display element and which is incorporated in a single lens reflex camera.
Figure 3B:
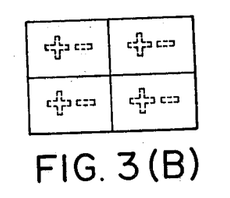
FIGS. 3(B) and 3(C) illustrates examples of the display pattern used in FIG. 3(A)
Figure 3C:
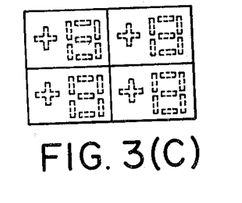

Embodiments of the present invention will hereinafter be described with reference to the drawings. FIGS. 1-3 show display portions, and FIGS. 4-7 show electrical processing portions used to drive the display portions.

The display portions are designed so that displays are effected corresponding to the metering positions of the object in the phototaking picture plane. That is, when metering is being effected with the object divided, for example, into sixteen parts by sixteen light-receiving elements, the display portions display the phototaking picture plane while dividing the same plane into sixteen so as to indicate the metering values of the respective parts of the object. The display portion of the present embodiment is that applied to a single lens reflex camera, and the viewfinder screen and the display portion are disposed in overlapped relationship with each other, so that the photographer can view the object picture plane and the picture plane of the display portion in their overlapped relationship.

In the example of FIG. 1(A), an electrochromic (EC) display element as the display portion 1 is provided between the viewfinder screen 2 and a condenser lens 6. This electrochromic display element is normally transparent when no voltage is being applied thereto, and the observation of the object may be effected through such transparent electrochromic display element without any inconvenience. Designated by 3 is a mirror, 4 an objective lens, 5 a pentaprism, and 7 an eyepiece. The viewfinder screen 2 to the eyepiece 7 are of the known construction. This display portion 1 comprises a plurality of electrochromic display elements divided corresponding to the metering positions in the phototaking picture plane as shown in FIG. 1(B) (divided into thirty-five). After the metering, when the photographer depresses a display instructing switch, not shown, a voltage is applied to an electrochromic display element lying at a picture plane position having an exposure value obtained by the metering with the distribution of the brightness of each part of the object in the phototaking picture plane being taken into account and having a brightness within a certain allowable exposure value $\delta$ (e.g. $\pm 1$ [EV]) and that electrochromic display element is colored. Of course, it is also possible to render the colored condition reverse thereto. Accordingly, from the colored condition of the electrochromic display element corresponding to a particular part of the object, the photographer can known whether or not the major object is within a range of exposure which becomes proper at the exposure value being presently obtained. Where the camera is one which effects automatic exposure, it is also possible to impart a suitable correction value to the exposure value being obtained by the metering to again operate the display portion 1 and obtain a desired exposure value while confirming the exposure condition with respect to the major object.

FIG. 2 shows an example in which display is effected by liquid crystal divided into four corresponding to the four-division metering of the phototaking picture plane. This example is designed so that, through a display portion 1' as shown in FIG. 2 which is provided on the view-finder screen 2, the displays +, − can be viewed at four locations in the picture plane in overlapped relationship with the picture plane. By one of the displays +, − being displayed, it can be known whether the exposure of the displayed portion is over-lapped or under-exposed with respect to the exposure value being presently obtained.

FIG. 3 shows an example in which the display element is constituted by a light-emitting diode. In this case, the display portion is not transparent and therefore, the display element must be disposed at a different position from FIGS. 1 and 2.

In the embodiment of FIG. 3(A), design is made such that display of a light-emitting diode 1" can be effected by visibility adjusting lenses 8, 8' and mirrors 9, 9', 9" on a plane optically coplanar with the viewfinder screen 2.

FIG. 3(B) shows an example in which a light-emitting diode is caused to effect displays +, −. These displays can be displayed by segment display elements of the light-emitting diode. FIG. 3(C) shows an example in which the deviation from an exposure value Pans is quantitatively displayed by seven segment display elements of a light-emitting diode.

Besides these, an electroluminance display element, a plasma display element or the like is usable as the display element. Also, other visually appropriate patterns are conceivable as the display pattern.

Description will now be made of several examples of the electric circuit for driving the display portion. These circuits are determined by the type of the display element and the substance of the display pattern.

Figure 4A:
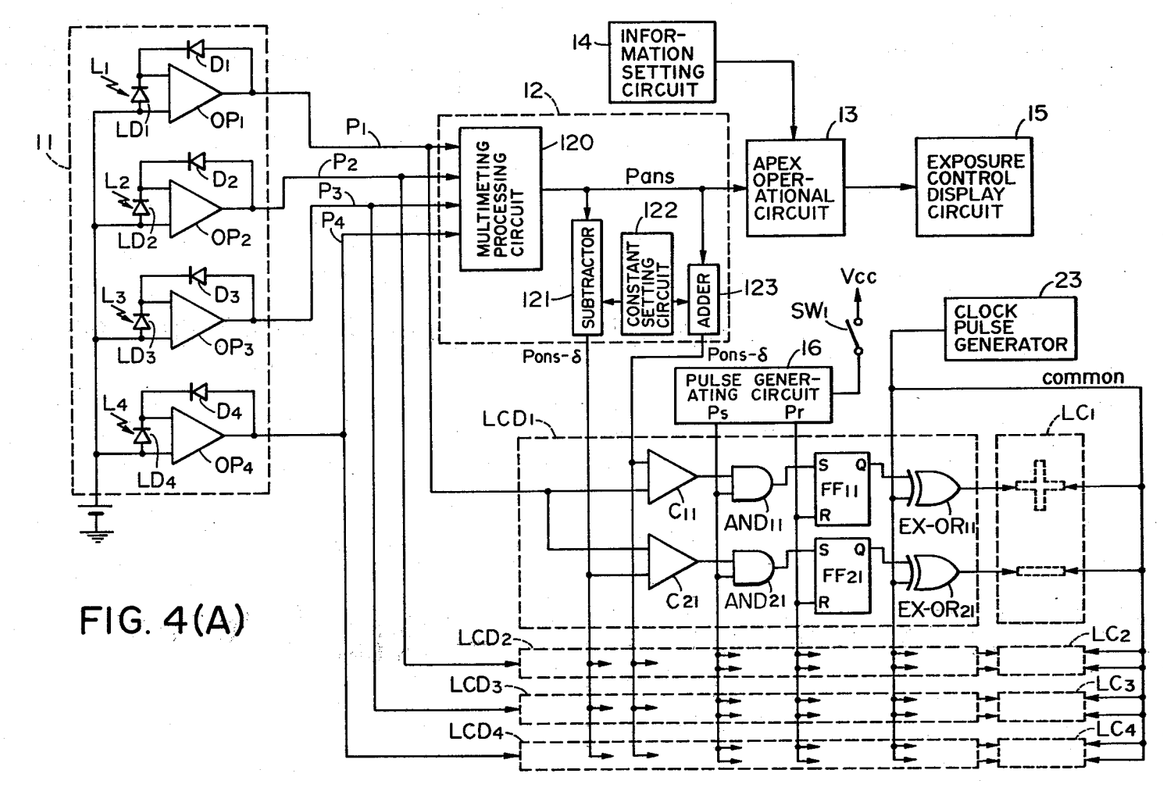
FIG. 4(A) shows an example of the driving circuit for liquid crystal when the liquid crystal is used as the display element.

The circuit of FIG. 4(A) is a driving circuit in an arrangement in which liquid crystals $LC_1$-$LC_4$ are used as the display element and the exposure condition of each part of the picture plane is displayed in the form of display pattern +, − as shown in FIG. 2(B). A metering portion 11 comprises light-receiving elements $LD_1$-$LD_4$, operational amplifiers (OP amps) $OP_1$-$OP_4$, and diodes $D_1$-$D_4$, and the lights $L_1$-$L_4$ of the respective parts of the picture plane are applied to the corresponding light-receiving elements $LD_1$-$LD_4$ and logarithmically compressed photoelectric outputs $P_1$-$P_4$ are emitted. The outputs $P_1$-$P_4$ are applied to a multimetering processing circuit 120, in which the metered value of each part is operationally processed and an output Pans which can be regarded as a proper exposure is transmitted to an apex operational circuit 13. The output Pans is, for example, the mean value of the outputs $P_1$-$P_4$. An information setting circuit 14 provides necessary information such as film speed, shutter speed and aperture to the operational circuit 13. The output of the operation circuit 13 is applied to an exposure control display circuit 15. The exposure control display circuit 15 includes a display portion which displays shutter speed when the output of the operational circuit 13 corresponds to the shutter speed and displays aperture value when the output of the operational circuit 13 corresponds to the aperture, and a control portion which controls the shutter and aperture to the applied shutter speed and aperture value, respectively. What has been described above is an electric circuit for operationally processing the exposure value which belongs to the prior art.

The proper exposure value Pans of the multimetering processing circuit 120 is applied to a subtractor 121 and an adder 123, in which an allowable exposure value $\delta$ which is the output of a constant setting circuit 122 is subtracted or added. Accordingly, the output of the subtractor 121 is Pans $+\delta$ and the output of the adder 123 is Pans $-\delta$. The multimetering processing circuit 120, subtractor 121, adder 123 and constant setting circuit 122 may be conceptually collectively considered as a multimetering processing portion 12.

There are driving circuits $LCD_1$-$LCD_4$ for driving the display elements (liquid crystals) of the respective parts of the picture (in the drawing, only LCD, is specifically shown). The output Pans $+\delta$ of the adder 123 is applied to the comparators $C_1N$ (N=1, 2, 3, 4) of the driving circuits $LCD_1$-$LCD_4$ (only the comparator $C_{11}$ is shown), and the output Pans $-\delta$ of the subtractor 121 is applied to the comparators $C_2N$ (N=1, 2, 3, 4) (only the comparator $C_{21}$ is shown). As will be apparent from the foregoing description, N(1, 2, 3, 4) are the numbers corresponding to the four display elements divided in the picture plane. The metered amount PN of the divided picture plane N is applied to the comparators $C_1N$ and $C_2N$, in which Pans $\pm\delta$ is compared with the metered amount PN. The drawing specifically shows only the case where the metered amount $P_1$ of the picture plane 1 is compared with Pans $\pm\delta$ in the comparators $C_{11}$ and $C_{21}$. The display instructing switch $SW_1$ is a normally open switch, and when in its ON position, it applies a high level signal to a pulse generating circuit 16, and when in its OFF position, it applies a low level signal to the pulse generating circuit 16. The pulse generating circuit 16 generates a sampling pulse at its terminal Ps when the input signal thereto changes from a high level to a low level. Next, when the display instructing switch $SW_1$ is closed and thereafter is released, the pulse generator 16 generates a reset pulse at its terminal Pr.

Figure 4B:
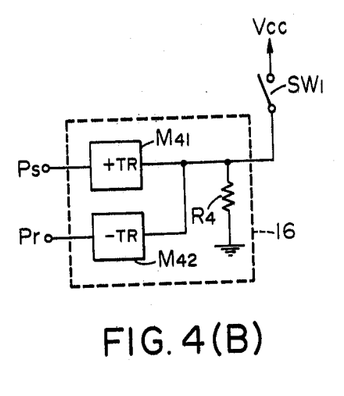
FIG. 4(B) is a block diagram showing the details of a pulse generating circuit 16 in the circuit of FIG. 4(A)

The pulse generating circuit 16, as shown in FIG. 4(B), comprises two one-shot multivibrators $M_{41}$ and $M_{42}$ and the input thereof is pulled down by a resistor $R_4$. When the user wants to know to which portion the proper exposure value Pans corresponds and when the switch $SW_1$ is closed, the input of the TR terminal of the one-shot multivibrator $M_{41}$ changes from a low level to a high level, so that a sampling pulse is generated from the output terminal Ps of the multivibrator $M_{41}$. After the user has confirmed and when the switch $SW_1$ is opened, the input of the $-$TR terminal of the one-shot multivibrator $M_{42}$ changes from a high level to a low level and a reset pulse is generated from the terminal Pr.

The terminal Ps of the pulse generating circuit 16 is applied to one input of AND circuits $AND_{IN}$ (in the drawing, $AND_{11}$) and $AND_2N$ (in the drawing $AND_{21}$), and the outputs of comparators $C_1N$ (in the drawing, $C_{11}$) and $C_2N$ (in the drawing, $C_{21}$) are applied to the other input. The terminal Pr of the pulse generating circuit 16 is applied to the reset input R of flip-flops $FF_{IN}$ (in the drawing, $FF_{11}$) and $FF_2N$ (in the drawing, $FF_{21}$), and the outputs of the AND circuits $AND_1N$ (in the drawing, $AND_{11}$) and $AND_2N$ (in the drawing, $AND_{21}$) are applied to the set input S. A rectangular wave pulse for driving the liquid crystal display elements LCN (in the drawing, $LC_1$) is put out from a clock pulse generator 23, and this rectangular wave pulse is applied to the common electrode of the liquid crystal display elements LCN (in the drawing, $LC_1$) and also applied to the electrodes of the respective segments through exclusive logic sum circuits EX-$OR_1N$ (in the drawing, EX-$OR_{11}$) and EX-$OR_2N$ (in the drawing, EX-$OR_{21}$). The $\alpha$ outputs of the flip-flops $FF_1N$ and $FF_2N$ are applied to the other inputs of the circuits EX-$OR_1N$ and EX-$OR_2N$. The circuit EX-$OR_1N$ drives the $+$ electrode of the display element LCDN and the circuit EX-$OR_2N$ drives the $-$ electrode of the display element LCDN.

Operation of this circuit arrangement will now be described.

(1) When PN > Pans $-\delta$ (namely, when the brightness PN of the divided picture plane N is an over-exposure as compared with the exposure value Pans being presently obtained):

The output of the comparator $C_1N$ assumes a high level. When the switch $SW_1$ is closed, a sampling pulse is generated at the terminal Ps of the pulse generating circuit 16 and at this time, the output of the AND circuit $AND_1N$ assumes a high level. Accordingly, the flip-flop $FF_1N$ is set and the $\alpha$ output thereof also assumes a high level. Thereupon, the rectangular wave pulse of the output of the circuit EX-$OR_1N$ becomes opposite in phase to the rectangular wave pulse to the common electrode and the $+$ pattern of the display element LCN is displayed.

On the other hand, Pans$-\delta$ < Pans$-\delta$ < PN. and therefore, the output of the comparator $C_2N$ is at a low level and accordingly, the output of the AND circuit $AND_2N$ is at a low level and the Q output of the flip-flop $FF_2N$ is at a low level, and the rectangular wave pulse applied to the—pattern segment electrodes of the display element LCN comes into phase with the rectangular wave pulse applied to the common electrode and thus, the pattern $-$ is not displayed.

(2) When PN < Pans $-\delta$ (namely, when the brightness PN of the divided picture plane N is an under-exposure as compared with the exposure value Pans being presently obtained):

The output of the comparator $C_2N$ assumes a high level. The switch $SW_1$ is closed and a sampling pulse is generated, and the output of the AND circuit $AND_2N$ assumes a high level. Accordingly, the Q output of the flip-flop $FF_2N$ assumes a high level and conversely to the case of (1) above, the pattern—is displayed. On the other hand, PN < Pans $-\delta$ < Pans $+\delta$ and therefore, the output of the comparator $C_1$ N is at a low level and the pattern $+$ is not displayed.

(3) When Pans $-\delta$ < PN < Pans $+\delta$ (namely, when the brightness PN of the divided picture plane N is within an allowable value $\delta$ from the exposure value Pans being presently obtained and accordingly, is a proper exposure):

The outputs of the comparators $C_1N$ and $C_2N$ both assume a low level and therefore, the patterns $+$, $-$ are not displayed by the display element LCN.

To extinguish the display of the pattern, the switch $SW_1$ may be opened. Thereupon, a reset pulse is generated at the terminal Pr of the pulse generating circuit 16 and the flip-flops $FF_1N$ and $FF_2N$ are both reset and the $\alpha$ outputs thereof assume a low level. Accordingly, the rectangular wave pulse to the pattern segment electrodes and the rectangular wave pulse to the common electrode come into phase with each other and all displays are extinguished.

Figure 5A:
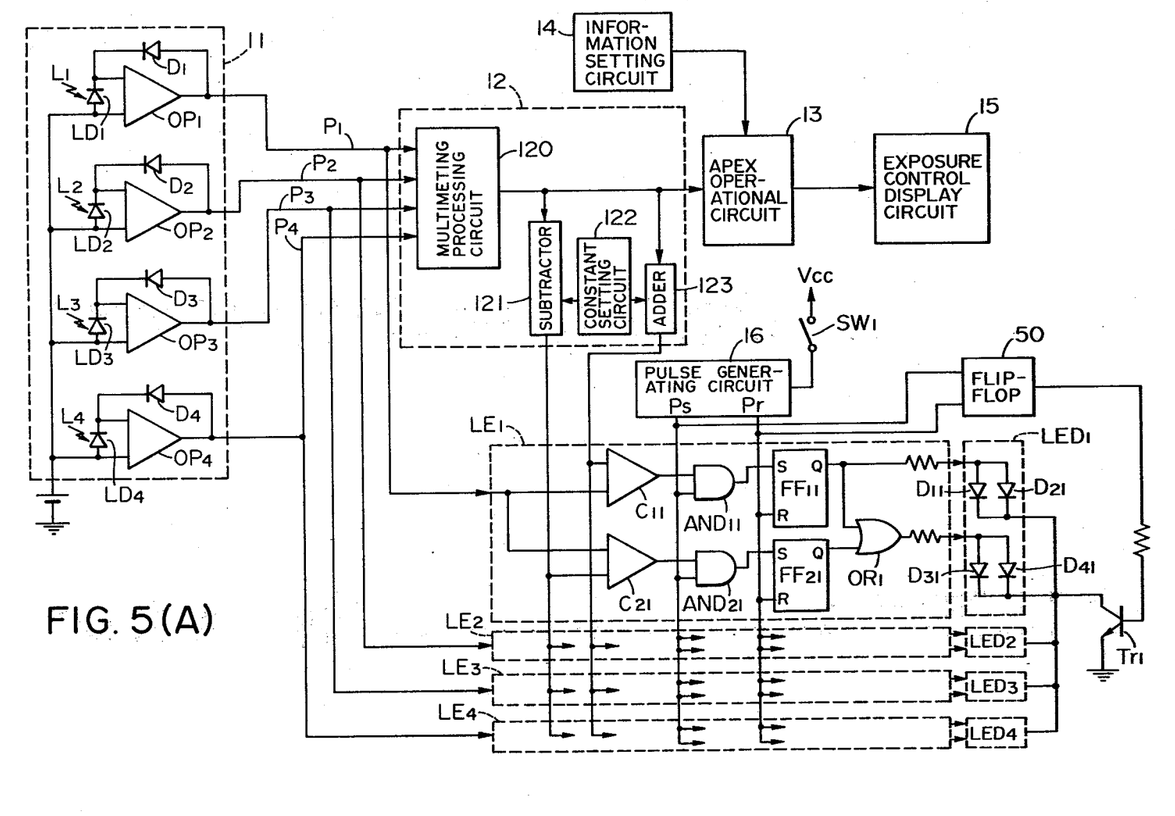
FIG. 5(A) shows an example of the driving circuit in which a light-emitting diode is used as the display element to effect the display as shown in FIG. 3(B)

FIG. 5(A) shows an embodiment in which light-emitting diodes LED1-LED4 are used as the display elements and the display patterns ($+$, $-$) are selectively displayed by four segments $D_1N$, $D_2N$, $D_3N$ and $D_4N$, as shown in FIG. 3(b). The case of N=1 will hereinafter be described with reference to FIG. 5(A).

Figure 5B:
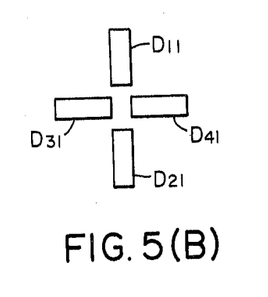
FIG. 5(B) shows the arrangement of light-emitting diodes.

The circuit forming portion 11-16 is the same as the circuit forming portion of FIG. 4. In a circuit $LE_1$ for driving the display element LED1, the constructions of comparators $C_{11}$, $C_{21}$, AND circuits $AND_{11}$, $AND_{21}$ and flip-flops $FF_{11}$, $FF_{21}$ are also the same as in the embodiment of FIG. 4. The $\alpha$ outputs of the flip-flops $FF_{11}$ and $FF_{21}$ are applied to an OR circuit $OR_{11}$, the output of which is applied to the segments D31 and D41 of the display element $LED_1$. The $\alpha$ output of the flip-flop $FF_{11}$ is directly applied to the segments D11 and D21 of the display element $Led_1$, and segments $D_{11}$-$D_{41}$ are arranged as shown in FIG. 5(B). The common electrode of the display element $LED_1$ is connected to the collector of NPN transistor $Tr_1$, the base of which is biased by the output of a flip-flop 50. The flip-flop 50 is set by the sampling pulse Ps and reset by the reset pulse Pr.

Operation of this circuit arrangement will now be described.

(1) When $P_1 > Pans - \delta$:

The output of comparator $C_{21}$ assumes a high level, the $\alpha$ outputs of flip-flop $FF_{21}$ assumes a high level, the output of OR circuit $OR_{11}$ assumes a high level and segments $LED_{31}$ and $LED_{41}$ are turned on. On the other hand, the $\alpha$ output of flip-flop $FF_{11}$ is at a low level and therefore, segments $LGD_{11}$ and $LED_{21}$ are not displayed. Accordingly, minus (−) is displayed.

(2) When $P_1 < Pans + \delta > Pans - \delta$:

The outputs of comparators $C_{11}$ and $C_{21}$ both assume a high level and segments $LED_{11}$-$LED_{41}$ are all turned on and plus (+) is displayed.

(3) When $Pans - \delta < P_1 < Pans + \delta$:

The outputs of comparators $C_{11}$ and $C_{21}$ both assume a low level and none of segments LED is turned on.

Figure 6A:
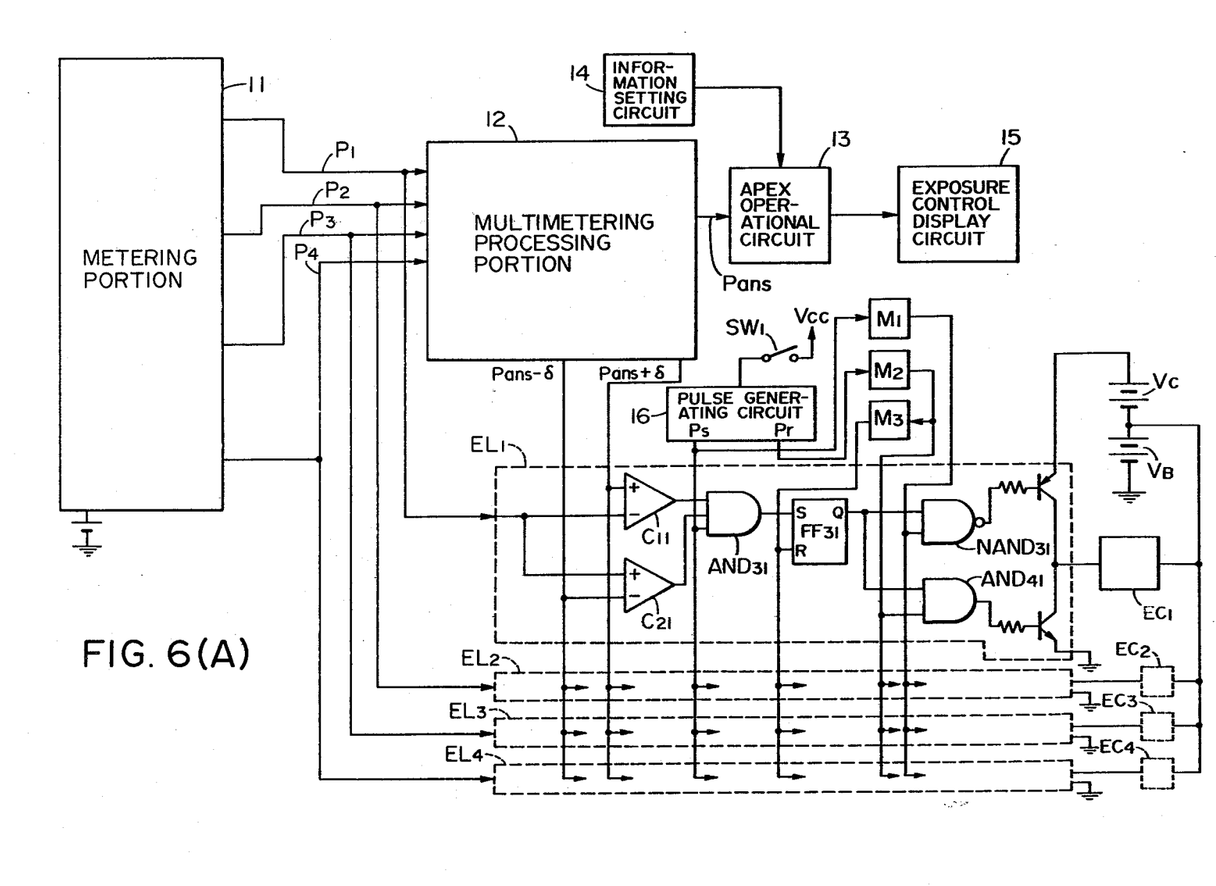
FIG. 6(A) shows an example of the driving circuit in which an electrochromic element is used as the display element.
Figure 6B:
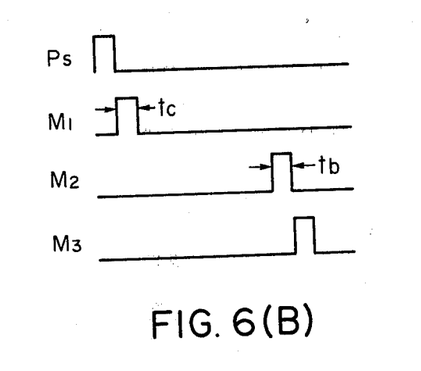
FIG. 6(B) is a timing chart illustrating the relation between the pulse generated at the terminal Ps of the pulse generated 16 in the circuit of FIG. 6(A) and the pulses generated by one-shot multivibrators $M_1$-$M_3$.

FIG. 6(A) shows the driving circuits $EL_1$-$EL_4$ of the display portion in which electrochromic elements $EC_1$-$EC_4$ are used as the display elements and the display pattern in produced and extingusihed colors as shown in FIG. 1(B). FIG. 6(B) is a timing chart for illustrating the operation thereof.

The operations of the common portions are as previously described and need not be described in detail.

The sampling pulse generated at the terminal Ps of the pulse generating circuit 16 is applied to one input termanl of NAND circuit $NAND_3N(N=1-4)$ and a one-shot multivibrator $M_1$. By receiving the sampling pulse, the one-shot multivibrator $M_1$ puts out a pulse of a sufficient time width tc to color the electrochromic element $EC_N(N=1-4)$. The resit pulse generated at the terminal Pr of the pulse generating circuit 16 is applied to a one-shot multivibrator $M_2$. By receiving the reset pulse, the one-shot multivibrator $M_2$ puts out a pulse of a sufficient time width te to extinguish the color of the electrochromic element $EC_N$. The pulse of the one-shot multivibrator $M_2$ is further applied to a pulse generator $M_3$. The pulse generator $M_3$ applies a reset pulse to the reset input R of flip-flop $FF_{31}$ upon falling of the input pulse. Description will hereinafter be made with N=1 taken as an example.

(1) When $Pans - \delta < P_1 < Pans + \delta$, the outputs of comparators $C_{11}$ and $C_{21}$ assume a high level and when the sampling pulse is generated, the output of AND circuit $AND_{31}$ assumes a high level. At this time, the $\alpha$ output of flip-flop $FF_{31}$ assumes a high level and indicates the display condition. In subsequence to the sampling pulse, the one-shot multivibrator $M_1$ assumes a high level for a time tc required to color the electrochromic elements. Since the $\alpha$ output of flip-flop $FF_{31}$ is connected to the other input terminal of NAND circuit $NAND_{31}$, the output of NAND circuit $NAND_{31}$ assumes a low level and transistor $Tr_{11}$ is turned on. Thereupon, since the emitter side of the transistor $Tr_{11}$ is supplied with a voltage $(V_B + V_C)$, the voltage $(V_B + V_C)$ is applied to the segment electrodes of the electrochromic element $EC_1$. On the other hand, $V_B$ is applied to the common electrode side of the electrochromic elements $EC_N$ and therefore, a voltage $V_C$ is applied between the electrodes of the electrochromic element $EC_1$. In this manner, the voltage $V_C$ required for the coloring is applied to the electrochromic element $EC_1$ for the time tc, so that the electrochromic element $EC_1$ is colored. Even if the application of the voltage is discontinued after the time tc, the electrochromic element remains colored due to its memory characteristic.

(2) When $P_1 < Pans - \delta$ or $Pans + \delta < P_1$, the output of the NAND circuit $NAND_{31}$ is always at a low level and after all, the transistor $Tr_{11}$ remains OFF and no coloring occurs.

On the other hand, when the pulse of the one-shot multivibrator $M_2$ is generated under the condition in which the $\alpha$ output of the flip-flop $FF_{31}$ is at a high level, namely, in the display condition, the output of AND circuit $AND_{41}$ assumes a high level for a time tb required to extinghish the color of the electrochromic element $EC_1$. Accordingly, transistor $Tr_{21}$ is turned on for the time tb. Consequently, the voltage applied to the segment electrodes of the electrochromic element $EC_1$, becomes OV. On the other hand, $V_B$ is applied to the common electrode side and therefore, the voltage $V_B$ which is opposite in direction to that during the coloring is applied to the electrochromic element. That is, a voltage $-V_B$ necessary for color extinction is applied to the electrochromic element for the time tb and the electrochromic element loses its color.

When the color extinction is completed, after the time tb, a reset pulse from pulse generator $M_3$ enters the reset input R of flip-flop $FF_{31}$ to reset the flip-flop $FF_{31}$.

With the above-described construction, when the photographer desires, it is possible to color and display the electrochromic element lying in the divided picture plane corresponding to the metering position which satisfies $Pans - \delta < P_N < Pans + \delta$.

To reverse the display condition, the outputs of comparators $C_1N$ and $C_2N$ may be once inverted.

Figure 7A:
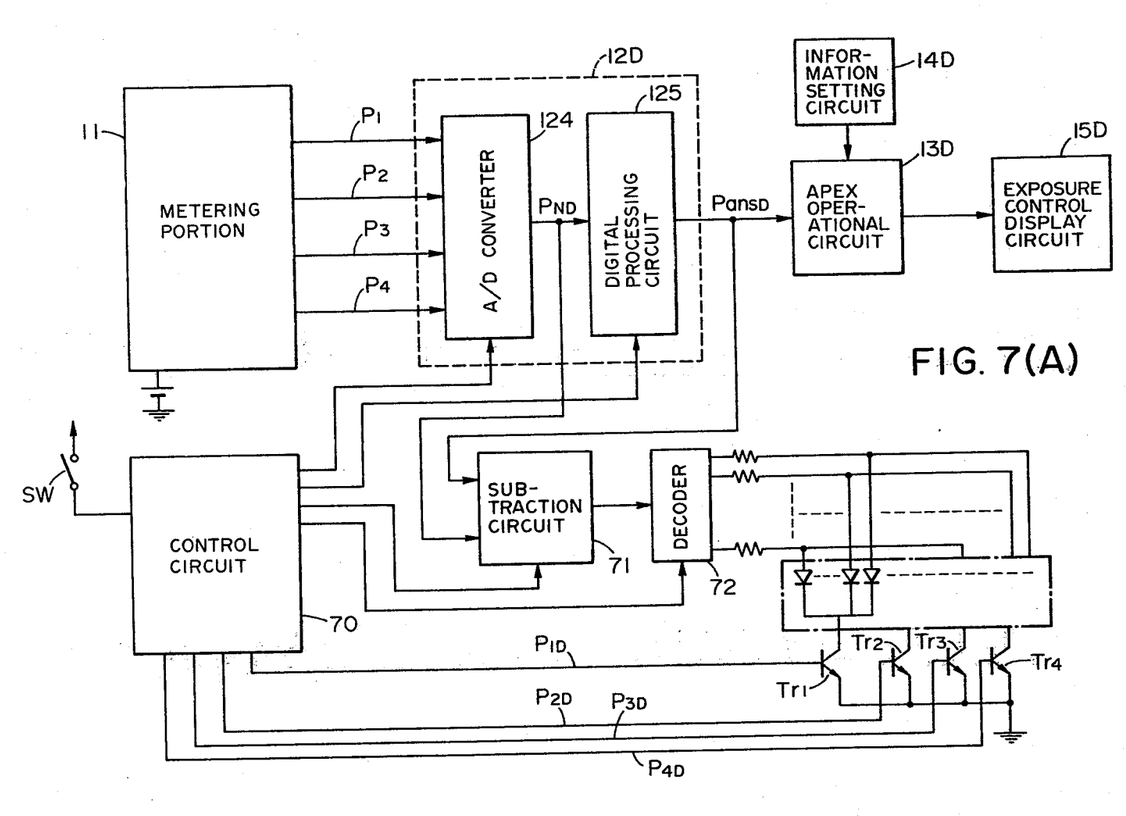
FIG. 7(A) shows an example of the driving circuit in which seven segments with signs of a light-emitting diode are used as the display element.

FIG. 7 shows a circuit for driving the seven segments with signs of FIG. 3(C) when constituted by light-emitting diodes.

The difference of this circuit from the circuit hitherto described lies in that the signal from the metering processing system which takes synchronization by a control circuit 70. In FIG. 7, elements functionally similar to those in the hitherto described circuit are given similar reference characters with suffix D so as to indicate that they are the circuits for effecting the digital processing.

Figure 7B:
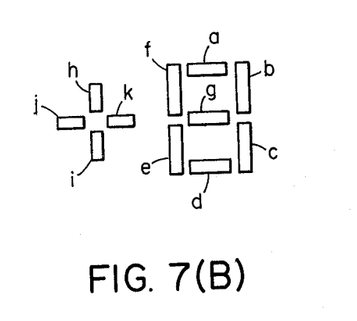
FIG. 7(B) shows the pattern of the display element driven by the circuit of FIG. 7(A).

A/D converter 124 successively digitalizes the signals $P_1$-$P_4$ from the metering portion 11 in accordance with the synchronous signal from the control circuit 70 and emits the digitalized signals. The thus emitted signals PND (N=1-4) are successively introduced into a digital processing circuit 125 and the mean value or the like thereof is calculated. The digital processing circuit 125 emits a metering signal Pans D such as the mean value of the input signals $P_{1D}$–$P_{4D}$ by the synchronous signal from the control circuit 70. A subtraction circuit 71 compares the output $P_{ND}$ of the A/D converter 124 with the output Pans D of the digital processing circuit 125 and emits a signal corresponding to the difference $P_{ND}$–PANS D therebetween. In that case, which of signals $P_{1D}$–$P_{1D}$ the input signal $P_{ND}$ is discriminated by the synchronous signal from the control circuit 70. A decoder 72 drives a 7-segment display portion LED provided by light-emitting diodes, by the output signal $P_{ND}$–Pans D of the subtraction circuit 71. The light-emitting diodes constituting the seven segment display portion LED are provided so as to display the pattern as shown in FIG. 7(B) in each of the divided picture planes. That is, eleven light-emitting diodes a-k are prepared for each divided picture plane and therefore, when the divided picture planes are four, the display portion LED includes a total of forty-four light-emitting diodes. Transistors $Tr_1$–$Tr_4$ correspond to respective ones of the divided picture planes and the cathodes thereof are connected to the anodes of the eleven light-emitting diodes (a-K) for each corresponding picture plane. These transistors $Tr_1$–$Tr_4$ are ON-OFF controled by the control circuit 70. That is, if a switch SW is closed to apply a display signal to the control circuit 70, the transistors $Tr_1$–$Tr_4$ become controllable and are successively turned on in synchronism with the output of the A/D converter 124. More specifically, when the A/D converter 124 is emitting signal $P_{1D}$, the transistor $Tr_1$ is turned on and when the A/D converter 124 is emitting signal $P_{2D}$, the transistor $Tr_2$ is turned on. Such a driving system for light-emitting diodes is the so-called dynamic drive.

To eliminate blinking of the display, the A/D converter 124 may be provided with a memorizing function whereby, upon closing of the switch SW, a memorization instruction signal may be emitted from the control circuit 70.

When switch SW is closed, the A/D converter 124 holds each output. As a result, the output Pans of the processing circuit 125 is also held. The A/D converter 124 delivers its held outputs $P_{1D}$–$P_{4D}$ in succession. The subtraction circuit 71 delivers the difference between PN and Pans to the decoder 72. The decoder 72 converts the then operational output so as to be capable of driving the seven segments and emits the same. On the other hand, such PND (N=1–4) that Trn are turned on when the signal PN-Pans is being emitted are emitted from the control circuit 70 and the display portion LED is dynamically driven. Consequently, the photographer can know how many steps [EV] each part of the picture plane is spaced from the measured value Pans.

In the foregoing description, the comparison result has been displayed in the picture plane together with the object image, whereas this is not restrictive but the comparison result may also be displayed outside of the picture plane.

As has been described above, if the exposure display device of the present invention is added to a camera provided with a multimetering device, it is possible to judge before shutter release whether or not a proper exposure has been obtained with respect to the major object and accordingly, to carry out appropriate photography.

We believe that our novel exposure display device for a camera will now be understood and that the advantages thereof will be fully appreciated by those persons skilled in the art.

We claim:

1. An exposure display device for a camera including metering means for effecting metering while dividing a phototaking picture plane into a plurality of areas and for emitting a plurality of photoelectric conversion signals corresponding to said areas, and processing means for operating and emitting a proper exposure signal from the output signals of said metering means, said exposure display device comprising:
   comparing means for comparing respectively said plurality of photoelectric conversion signals with said proper exposure signal and emitting a plurality of the results of said comparison corresponding to the conversion signals; and
   display means for displaying said comparison signals in correspondence to said divided areas.

2. The exposure display device according to claim 1, wherein said display means includes:
   a plurality of display elements normally transparent and becoming translucent or opaque upon application of a voltage thereto, said display elements being disposed so as to overlap the object in the viewfinder of the camera while corresponding to said areas; and
   a control circuit for controlling each of said display elements in accordance with said comparison result.

3. The exposure display device according to claim 2, wherein said display elements are disposed in overlapped relationship with the viewfinder screen of the camera.

4. The exposure display device according to claim 3, wherein said display elements are liquid crystal or electrochromic elements.

5. The exposure display device according to claim 1, wherein said display means includes:
   a plurality of light-emitting elements normally opaque and emitting light upon application of a voltage thereto, said light-emitting elements being arranged so as to correspond to said areas;
   optical means for directing the light emitted from said light-emitting elements into the viewfinder of the camera; and
   a control circuit for controlling each of said display elements in accordance with said comparison result.

6. The exposure display device according to claim 5, wherein said display elements are light-emitting diodes or electroluminescence elements.

7. The exposure display device according to claims 1, 2 or 5, wherein said comparing means includes a discriminating circuit for discriminating whether or not each of said plurality of photoelectric signals is within the range of said proper exposure signal having an allowable exposure value added thereto and for emitting a first signal when said photoelectric signals are greater than the upper limit of said range and emitting a second signal when said photoelectric signals are smaller than the lower limit of said range, said display means displaying a first pattern in response to said first signal and a second pattern in response to said second signal.

8. The exposure display device according to claim 5, wherein said comparing means includes a subtraction circuit for comparing each of said plurality of photoelectric signals with said proper exposure signal and emitting difference signals provided with a sign corresponding to the difference therebetween, said light-emitting elements are seven segment elements provided with signs, and said control circuit controls each of said light-emitting elements so as to emit light in a pattern corresponding to said difference signals respectively.

* * * * *

UNITED STATES PATENT AND TRADEMARK OFFICE
CERTIFICATE OF CORRECTION

PATENT NO. : 4,309,091
DATED : January 5, 1982
INVENTOR(S) : TORU FUKUHARA, ET AL.

It is certified that error appears in the above-identified patent and that said Letters Patent are hereby corrected as shown below:

Column 1, line 24, after "plurality" insert --of bits of brightness information (metering outputs) cor- --.

line 58, "and" should read --the--.

Column 4, line 10, "over-lapped" should read --over-exposed--.

Column 7, line 23, " > " should be -- < --;

line 31, " < " should be -- > --.

Column 9, line 8, "$P_{1D} - P_{1D}$" should read --$P_{1D} - P_{4D}$--.

Signed and Sealed this

Sixth Day of July 1982

[SEAL]

Attest:

GERALD J. MOSSINGHOFF

Attesting Officer    Commissioner of Patents and Trademarks